UNITED STATES PATENT OFFICE.

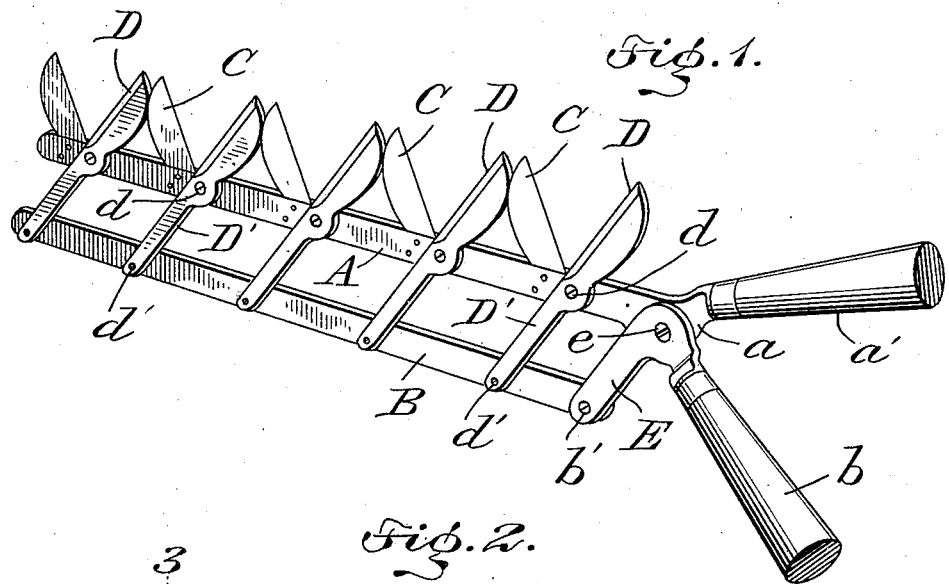
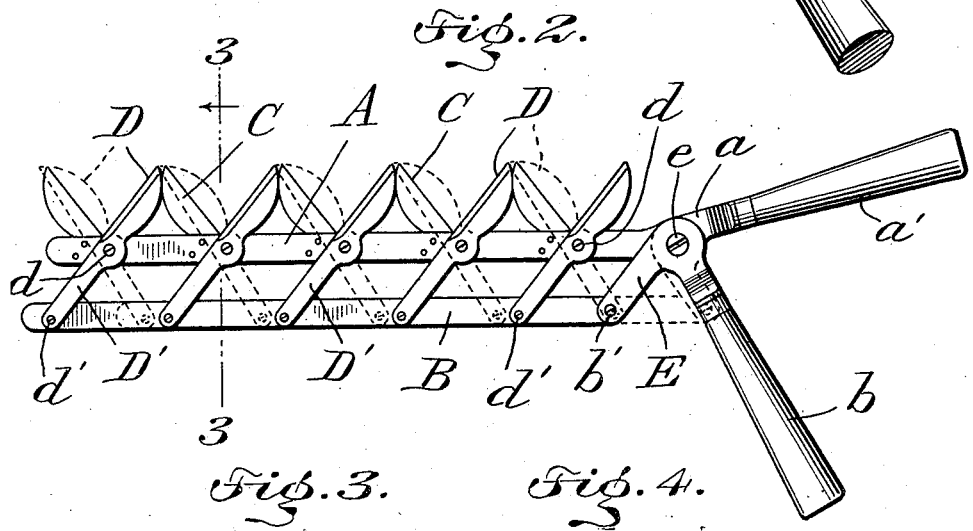
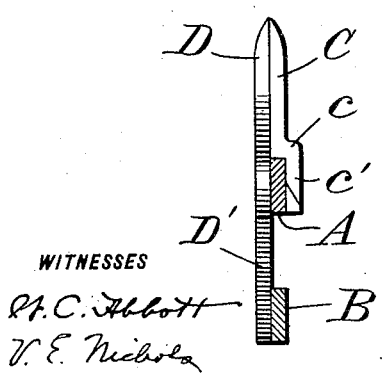
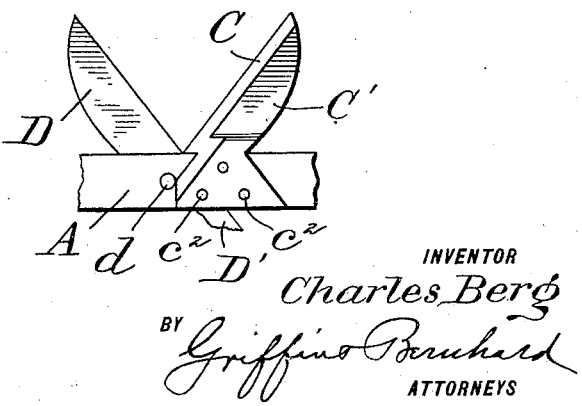

CHARLES BERG, OF NEW YORK, N. Y.

SHRUBBERY-CUTTER.

No. 888,058.

Specification of Letters Patent.

Patented May 19, 1908.

Application filed September 25, 1907. Serial No. 394,553.

*To all whom it may concern:*

Be it known that I, CHARLES BERG, a citizen of the United States, residing in the city of New York, borough of Brooklyn, county of Kings, and State of New York, have invented a certain new and useful Shrubbery-Cutter, of which the following is a specification.

This invention is an implement for cutting shrubbery, hedges, and other vegetable growths.

The object in view is to enable shrubbery and hedges to be accurately and expeditiously trimmed with less labor than is required when using ordinary hedge shears.

My new implement is adapted to be carried and operated with ease, and when used it cuts over a wider area than ordinary shears, whereby a hedge can be trimmed more accurately and expeditiously, thereby saving a very considerable amount of time and labor.

The implement comprises a plurality of cutting devices and means for operating them simultaneously, said cutting devices being disposed in the same longitudinal plane for the purpose of operating over a wide area.

More specifically stated, the implement comprises in its construction a plurality of parallel members, cutting knives mounted on one of the members, other cutting knives connected pivotally to said parallel members and adapted for coöperation with the aforesaid knives, and means whereby a relative movement is imparted to said members for operating said knives.

In the accompanying drawings, I have illustrated one practical embodiment of the invention, but the construction shown therein is to be understood as illustrative, only, and not as defining the limits of the invention.

Figure 1 is a perspective view of a shrubbery cutter embodying the invention showing a plurality of cutters in open or separated positions. Fig. 2 is a side elevation illustrating a plurality of cutters in opened positions, by full lines, and in closed positions by dotted lines. Fig. 3 is a vertical cross section on the line 3—3 of Fig. 2. Fig. 4 is a detail view of one pair of coöperating blades.

The implement consists of parallel members, A, B, a plurality of non-movable blades, C, carried by one of the members, such as A, a corresponding number of blades, D, connected pivotally with the members, A, B, and disposed in coöperative relation to the non-movable blades, C, and an operating member, E, adapted to impart movement to the member, B, relative to the member, A, for the purpose of simultaneously opening and closing the plurality of cutting devices formed by the knives, C, D.

The member, A, consists, preferably, of a straight metallic bar of appropriate size which is enlarged near one end, as at $a$, and is bent laterally so as to form a shank (not shown), which shank is secured to the handle, $a'$. The other member, B, is a straight flat bar arranged parallel to the member, A.

Each knife, C, is preferably secured rigidly to the bar, A, so as to extend upwardly therefrom. It is preferred to arrange each knife, C, in an inclined position with respect to the axis of the bar, A, the inclination of the knives composing the series being similar. The detailed construction of each non-movable knife is shown in Figs. 3 and 4.

By reference to Fig. 3, it will be seen that each knife is offset, as at $c$, to produce a shank, $c'$, said offset portion resting on the top edge of the bar, A, whereby the longitudinally inclined cutting edge of the knife, C, is in the same plane as one face of the bar, A.

In Fig. 4 the knife blade, C, is shown as having a solid body portion, $C'$, one edge of which is sharpened to produce a cutting edge, said body portion, $C'$, being offset at $c$ and made fast with the bar, A, by appropriate fastening means, such as the screws or rivets, $c^2$.

The movable knives or blades, D, are attached to or made integral with links or arms, D', which extend across the bars, A, B. Each of said arms, D', is connected pivotally with the bar, A, as at $d$, and the end portion of each arm is connected pivotally to the bar, B, as at $d'$. The arms, D', are parallel to each other, and they operatively connect the bar, B, with the bar, A, in a manner to maintain the two bars in a parallel relation. The knives, D, move with the arms, D', so as to have shearing relation to the stationary knives, C, and when the bar, B, is operated, the knives, D, of one series are moved simultaneously with respect to the knives, C, of the other series.

The operating member, E, is represented in the form of the bell crank lever, the latter being pivoted or fulcrumed at its knee to the enlarged portion, $a$, of the bar, A, by a pivotal bolt, $e$. One arm of the bell crank lever is provided with a handle, $b$, whereas the other arm of said lever is connected pivotally at $b'$ with the bar, B.

In operation the implement is placed alongside of or upon the shrubbery, hedge or other growth which it is desired to cut, the blades being in the open position shown in the drawings. The operator draws the handle, $b$, toward the handle, $a'$, thereby moving the bell crank lever, E, on its fulcrum and imparting endwise movement to the bar, B. Said bar moves the arms, D', on their pivots, $d$, and the blades, D, are simultaneously moved toward the blades, C, so as to cause the two series of blades to shear past each other in cutting the hedge. The handle, $b$, is reversed for the purpose of opening the blades of one series with respect to the blades of the other series, and the implement is adjusted to a new position, after which the operations are repeated.

It will be observed that the plurality of cutting devices are in the same longitudinal plane for the purpose of operating at different points on the hedge or shrubbery; and further, that the cutting devices operate at different points on the shrubbery. The employment of a number of cutting devices, with means for simultaneously operating them, enables the hedge to be trimmed accurately and expeditiously, for the reason that it is not necessary to adjust the implement so frequently as is required in the use of ordinary shears, whereby a hedge may be trimmed at a considerable saving in time and labor.

It is to be understood, of course, that the size and proportion of the several parts will be determined according to the desired capacity of the implement, and that changes in the details of construction may be made by a skilled mechanic without departing from the principle of the invention.

Having thus fully described the invention, what I claim as new, and desire to secure by Letters Patent is:

1. A hedge or shrubbery trimming implement comprising a carrying bar, a handle in fixed relation to the bar and extending therefrom substantially in the plane of the bar and at an angle to the longitudinal axis thereof, an operating bar parallel to the carrying bar, knives in fixed positions relative to the carrying bar, swinging knives pivoted to both bars and coöperating with said fixed knives, and an operating lever fulcrumed on the carrying bar and connected to the operating bar, said operating lever being positioned substantially in the plane of the bars and movable in a path parallel to said plane.

2. A hedge or shrubbery trimming implement comprising a pair of bars, one of which is movable relative to the other, a series of knives fixed to the relatively non-movable bar, each of said knives being positioned on said bar so that the longitudinal axis of the knife is at an angle to the corresponding axis of the bar, swinging knives pivoted on the non-movable bar and each positioned thereon in coöperative relation to one of said other fixed knives, the cutting edges of each pair of coöperating knives being adapted to shear past each other, said pivoted knives having shanks which are pivoted to the movable bar, and means coöperating directly with said bars whereby the implement may be carried and the bars operated for imparting relative movement thereto.

3. A hedge or shrubbery trimming implement comprising a carrying bar, a series of knives each provided with a shank which is offset relative to the plane of the knife and produces a shoulder at the base thereof, whereby each knife is fitted on, and secured to, said bar so that one side of said knife is adapted to lie in the plane of one face of the bar, a movable bar, swinging knives each pivoted to both bars, and means coöperating with said bars whereby the implement may be carried and the bars operated for simultaneously imparting movement to the swinging knives.

4. A hedge or shrubbery trimming implement comprising a carrying bar provided with a rigid handle disposed substantially in the plane of said bar, a series of knives each having a shouldered part secured to said bar, whereby said knives are positioned in flush relation with one face of the bar, a movable bar, another series of knives each pivoted to both bars and coöperating with one of said fixed knives, and a bell-crank operating lever fulcrumed on the carrying bar and pivoted to the movable bar.

In testimony whereof I have signed my name to this specification in the presence of two subscribing witnesses.

CHARLES BERG.

Witnesses:
STEWART SCHLICK,
J. HARTNETT.